Patented Aug. 30, 1927.

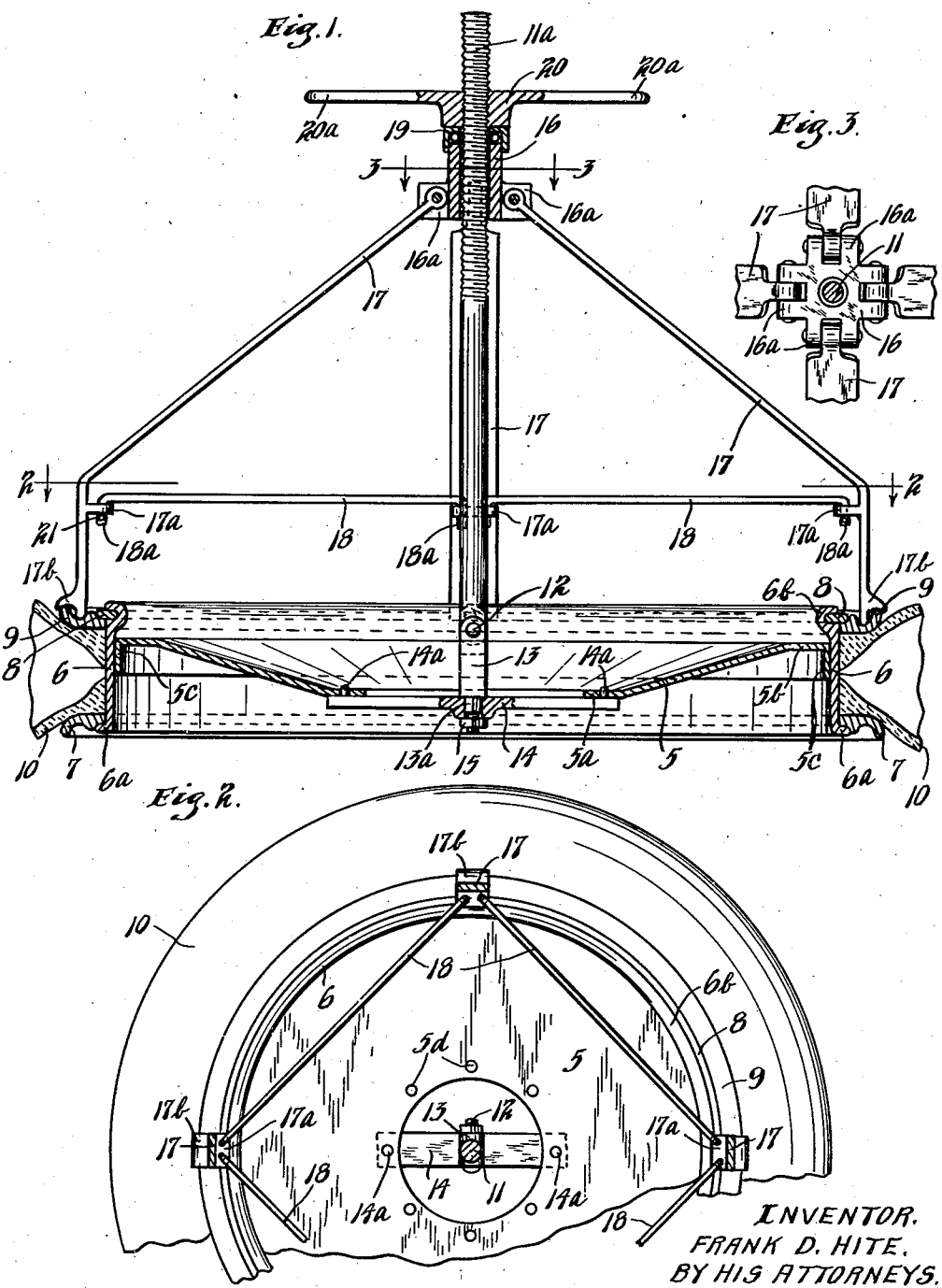

1,641,083

UNITED STATES PATENT OFFICE.

FRANK D. HITE, OF MINNEAPOLIS, MINNESOTA.

TIRE TOOL.

Application filed April 11, 1927. Serial No. 182,756.

This invention relates to a tire manipulating device and particularly to a device adapted to remove a tire from a wheel rim. The automobile wheels used on modern buses which are usually of disk type, are quite large, as are also the tires used. These tires are held on the rim by side rings and one of these side rings is usually held in place by a locking ring fitting against the same and into a recess in the rim. In use these side rings and locking rings become rusted and are thus held very tightly in place. The tires also become firmly attached to the rims and side rings and it is very difficult to remove the tires. It is desirable, therefore, to have some simple and efficient means by which the side rings and locking means can be removed and by means of which the tire can also be removed from the rim.

It is an object of this invention, therefore, to provide a simple and efficient device by means of which the locking ring and side rings can be removed from the rim and the tire also removed from the rim.

It is a further object of the invention to provide such a device comprising a central member having means to engage one side of the wheel and having circumferentially spaced means to engage the side ring at the other side of the wheel, said central member and last mentioned means being relatively movable whereby the side ring may be forced inwardly.

It is a further object of the invention to provide such a tool comprising circumferentially spaced arms adapted to engage about the side ring at one side thereof and being connected by members extending therebetween when the tool is in operative position, said members being removable whereby the tool can be collapsed.

These and other objects and advantages of the invention will be fully set forth in the following description made in connection with the accompanying drawings, in which like reference characters refer to similar parts throughout the several views and in which:—

Fig. 1 is a central vertical section through the device;

Fig. 2 is a horizontal section taken on line 2—2 of Fig. 1; and

Fig. 3 is a horizontal section on line 3—3 of Fig 1.

Referring to the drawings, an automobile wheel such as used on modern bus or truck vehicles is shown, comprising a disk 5 having a central annular flange $5^a$ parallel to the plane of the wheel and an outer annular portion $5^b$ also parallel to the plane of the wheel, said disc being bent at right angles to have a cylindrical outer portion $5^c$ which is riveted or otherwise secured to the cylindrical rim 6. The annular flange $5^a$ has a plurality of circumferentially spaced holes $5^d$ through which extend attaching means for securing the wheel to the hub. The rim 6 has a flange $6^a$ at one side and another detachable flange or side ring 7 is formed to fit against the outer side of said rim and against said flange and extend partly thereover, said side ring curving outwardly toward the side of the wheel. The rim 6 at its other side has a circumferentially extending recess or trough portion $6^b$ formed therein and a locking ring 8 of simple cylindrical form has one edge fitting in said groove or the recess $6^b$ and extending about the rim, said locking ring 8 being split so that it can be expanded to be removed and inserted in place. Another side ring or detachable flange 9 is provided engaging the rim at the inner side of the locking ring 8 and extending partly over said locking ring, said side ring also flaring outwardly at the outer side of said ring. The usual pneumatic tire 10 is shown as held in place between the detachable flanges 7 and 9.

The tool of the present invention includes a stem 11 which is threaded at its upper end for a considerable distance as shown at $11^a$. The stem 11 is pivoted at its lower end by a pivot 12 to a vertical bar or rod 13, the upper end of which is bifurcated to receive the lower end of the stem 11. The rod 13 has a squared or angularly shaped portion $13^a$ extending through a similarly shaped recess in a bar 14 having a boss or thickened portion at its center, said member 13 having a threaded end projecting through the bar 14 for receiving the nut 15. The bar 14 extends across the annular flange $5^a$ on the disk 5 and is provided with pins $14^a$ adapted to extend through opposite pairs of holes $5^d$. A sleeve 16 surrounds the threaded portion $11^a$ of the stem 11, being bored to have said portion pass therethrough, and said sleeve has a plurality of pairs of projecting lugs $16^a$. While the number of these lugs may be varied, in the embodiment of the invention illustrated, four pairs are shown disposed substantially 90° apart. A plurality of bars 17 are provided, the upper end of each of which is flattened and disposed between one of the pairs of lugs 16ª. The bars 17 extend downwardly and outwardly in an inclined direction from sleeve 16 and are bent at their lower ends to extend substantially vertically, said bars seating in the groove of side ring 9 and having portions 17ᵇ extending partly over the edge of said ring. Said bars 17 have lugs 17ª projecting inwardly and horizontally therefrom adjacent their lower ends, which lugs are provided with pairs of spaced holes. Rods 18 extend between the lugs 17ª, having their outer ends bent downwardly at 18ª to pass through the adjacent holes in said lugs, said rods 18 thus being disposed substantially in the form of a square as shown in Fig. 2. The rods 18 have small holes adjacent their ends through which cotter pins 21 may be passed to hold the rods in place. The sleeve 16 is engaged at its upper end by a ball-bearing member 19 shown as having a flange extending about the outer side of the sleeve 16, and a handle member 20 engages this threaded portion of stem 11, resting on the member 19. The member 20 has a central hub formed as a nut and has outwardly extending bars or handles 20ª projecting therefrom.

In the operation of the device the wheel will be placed on the ground or floor as shown and the bar 14 disposed under the flange 5ª, pins 14ª being inserted in the holes 5ᵈ as shown. The lower ends of the bars 17 will engage in the side ring 9 and rods 18 will be in place as shown in Figs. 1 and 2 The member 20 will now be turned by grasping its handle members 20ª and the stem 11 will be drawn upwardly and the bars 17 pushed downwardly. Great pressure can thus be brought on the side ring 9, which will be moved inwardly, pushing the bead of tire 10 inwardly or downwardly. When the ring or flange 9 has been moved downwardly sufficiently to clear the locking ring 8, the latter can be expanded and sprung out of position. When this is accomplished, the wheel will be inverted or turned on its other side and the bar 14 will be disposed beneath the opposite side of flange 5ª. The lower ends of bars 17 will be engaged in the groove of side ring or flange 7 and pressure exerted, pushing this side ring transversely of the rim 6. This ring and the bead of the tire adjacent thereto will thus be loosened and the tire and both rings or flanges 7 and 9 can be pushed transversely of and off of the rim. The locking ring, side rings and tire are thus easily, quickly and conveniently detached from the rim. As above stated, these parts become securely attached to the rim and their removal has been a very difficult task heretofore. When the tool is not in use, the rods 18 can be removed from lugs 17ª at one end, and these rods and the bars 17 can then all be moved into substantially parallel relation with the central stem 11, thus bringing the tool to a collapsed position in which it will take up little space.

From the above description it is seen that applicant has provided a very simple and efficient tire and ring removing device. The wheels of the type described are of the well known Budd Michelin type with Goodyear and Firestone rims, and as stated, these wheels are used for heavy vehicles such as modern busses. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A device for removing the detachable flanges and tire from the rim of a wheel having in combination, a central member having means at its lower end to engage one side of said wheel, a sleeve adjacent the other end of said member through which it passes, a plurality of circumferentially spaced bars pivoted to said sleeve and extending outwardly and downwardly therefrom having substantially vertical lower portions constructed and arranged to engage the side ring, means for holding said bars in proper position and a nut member having means for turning the same threaded on said stem above said sleeve and adapted to engage the same and exert pressure on said detachable flanges when rotated.

2. A device for removing the side rings and tire from the rim of a wheel having in combination, a central stem, a bar pivoted to the lower end thereof adapted to engage one side of said wheel, a member movable longitudinally of said stem, a plurality of circumferentially spaced bars pivoted at their upper ends to said stem and extending outwardly and downwardly therefrom constructed and arranged to engage a side ring at their lower ends, means connecting said bars adjacent their lower ends, and a rotatable member threaded on said stem above said second mentioned member adapted to cause relative movement of said stem and bars and exert pressure on said side ring.

3. A device for removing the tire, side and locking rings from a bus or truck wheel having an inner annular flange with hub attaching holes therethrough comprising a central stem, a bar pivotally connected to the lower end thereof adapted to extend across the lower side of said annular flange and having means disposed in a pair of said holes, a sleeve slidable on said stem, a plurality of circumferentially spaced bars pivoted to said sleeve at their upper ends and extending downwardly and outwardly therefrom, substantially horizontal rods connecting said bars adjacent their lower ends, a nut threaded on said stem above said sleeve having means for turning the same, and anti-friction means between said nut and said sleeve.

4. The structure set forth in claim 3, said rods being detachable whereby said arms and said bars may be collapsed into substantially parallel relation.

In testimony whereof I affix my signature.

FRANK D. HITE.